US008777723B2

(12) United States Patent
Bryant

(10) Patent No.: US 8,777,723 B2
(45) **Date of Patent: *Jul. 15, 2014**

(54) GAMING MACHINE WITH MULTI SCATTER GAME

(71) Applicant: Natalie Bryant, Lane Cove (AU)

(72) Inventor: Natalie Bryant, Lane Cove (AU)

(73) Assignee: Aristocrat Technologies Australia Pty Ltd. (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/627,484

(22) Filed: Sep. 26, 2012

(65) Prior Publication Data

US 2013/0190069 A1 Jul. 25, 2013

Related U.S. Application Data

(63) Continuation of application No. 13/036,541, filed on Feb. 28, 2011, now Pat. No. 8,298,073, which is a continuation of application No. 12/141,678, filed on Jun. 18, 2008, now abandoned, which is a continuation of application No. 09/935,104, filed on Aug. 22, 2001, now abandoned.

(30) Foreign Application Priority Data

Aug. 22, 2000 (AU) ..................................... PQ 9587

(51) Int. Cl.
*G06F 17/00* (2006.01)
*G06F 19/00* (2011.01)

(52) U.S. Cl.
USPC ................................. 463/20; 463/16; 463/25

(58) Field of Classification Search
USPC .......... 463/16–20, 25, 29–31; 273/138.1, 139
See application file for complete search history.

(56) References Cited

U.S. PATENT DOCUMENTS 4,448,419 A 5/1984 Telnaes
5,423,539 A 6/1995 Nagao
5,611,535 A 3/1997 Tiberio
6,159,098 A 12/2000 Slomiany et al.
6,190,254 B1 2/2001 Bennett (Continued)

OTHER PUBLICATIONS

Christensen, David G., Slot Machines A Pictorial Review, 1976, The Vestal Press, pp. 118-119.

*Primary Examiner* — Milap Shah
(74) *Attorney, Agent, or Firm* — McAndrews, Held & Malloy, Ltd.

(57) ABSTRACT

A gaming machine 10 has a display 14 and a game controller arranged to control images displayed on the display 14. The game controller is arranged to play a game wherein at least one random event is caused to be displayed on the display means and, if a predefined winning event occurs, the machine awards a prize. The display 14 displays a plurality of spinning reels 18, each reel 18 carrying symbols from a set of symbols. One of the symbols of the set is a scatter symbol and, in respect of at least one of the reels, the set comprises more than one occurrence of the scatter symbol. The scatter symbols on the at least one reel are arranged on the reel so that more than one scatter symbol is able to be displayed simultaneously when the reels are in a rest condition. When more than a minimum number of scatter symbols are displayed at any one time, all the displayed scatter symbols contribute to a single paying combination of the scatter symbols.

20 Claims, 4 Drawing Sheets

| POSITION | REEL 1 | REEL 2 | REEL 3 | REEL 4 | REEL 5 |
|---|---|---|---|---|---|
| 1 | ACE | QUEEN | JACK | QUEEN | JACK |
| 2 | KING | ACE | SYM_B | KING | KING |
| 3 | JACK | TEN | ACE | TEN | SYM_A |
| 4 | SCATTER | KING | QUEEN | JACK | JACK |
| 5 | ACE | QUEEN | SCATTER | KING | SCATTER |
| 6 | SCATTER | JACK | JACK | TEN | SCATTER |
| 7 | QUEEN | SYM_A | SCATTER | SYM_B | QUEEN |
| 8 | JACK | TEN | ACE | QUEEN | ACE |
| 9 | ACE | KING | KING | KING | KING |
| 10 | QUEEN | SCATTER | TEN | SCATTER | QUEEN |
| 11 | JACK | SCATTER | ACE | SCATTER | TEN |
| 12 | TEN | TEN | JACK | ACE | SYM_B |
| 13 | SYM_A | KING | KING | TEN | TEN |
| 14 | JACK | JACK | SYM_A | SYM_A | ACE |
| 15 | QUEEN | SYM_B | TEN | TEN | QUEEN |
| 16 | SYM_B | QUEEN | ACE | ACE | SYM_C |
| 17 | JACK | KING | KING | TEN | TEN |
| 18 | TEN | SYM_C | TEN | SYM_C | JACK |
| 19 | SYM_C | QUEEN | SYM_C | KING | KING |
| 20 | QUEEN | JACK | TEN | TEN | TEN |

(56) References Cited

U.S. PATENT DOCUMENTS

| | | | | |
|---|---|---|---|---|
| 6,358,147 | B1 | 3/2002 | Jaffe et al. | |
| 6,364,766 | B1 | 4/2002 | Anderson et al. | |
| 6,443,837 | B1 | 9/2002 | Jaffe et al. | |
| 6,471,208 | B2 | 10/2002 | Yoseloff et al. | |
| 6,520,855 | B2 | 2/2003 | DeMar et al. | |
| 6,551,187 | B1 | 4/2003 | Jaffe | |
| 8,298,073 | B2 * | 10/2012 | Bryant | 463/20 |
| 2001/0048193 | A1 * | 12/2001 | Yoseloff et al. | 273/138.1 |

* cited by examiner 50 50 50 50 50 52 52

| POSITION | REEL 1 | REEL 2 | REEL 3 | REEL 4 | REEL 5 |
|---|---|---|---|---|---|
| 1 | ACE | QUEEN | JACK | QUEEN | JACK |
| 2 | KING | ACE | SYM_B | KING | KING |
| 3 | JACK | TEN | ACE | TEN | SYM_A |
| 4 | SCATTER | KING | QUEEN | JACK | JACK |
| 5 | ACE | QUEEN | SCATTER | KING | SCATTER |
| 6 | SCATTER | JACK | JACK | TEN | SCATTER |
| 7 | QUEEN | SYM_A | SCATTER | SYM_B | QUEEN |
| 8 | JACK | TEN | ACE | QUEEN | ACE |
| 9 | ACE | KING | KING | KING | KING |
| 10 | QUEEN | SCATTER | TEN | SCATTER | QUEEN |
| 11 | JACK | SCATTER | ACE | SCATTER | TEN |
| 12 | TEN | TEN | JACK | ACE | SYM_B |
| 13 | SYM_A | KING | KING | TEN | TEN |
| 14 | JACK | JACK | SYM_A | SYM_A | ACE |
| 15 | QUEEN | SYM_B | TEN | TEN | QUEEN |
| 16 | SYM_B | QUEEN | ACE | ACE | SYM_C |
| 17 | JACK | KING | KING | TEN | TEN |
| 18 | TEN | SYM_C | TEN | SYM_C | JACK |
| 19 | SYM_C | QUEEN | SYM_C | KING | KING |
| 20 | QUEEN | JACK | TEN | TEN | TEN |

FIG. 3

GAMING MACHINE WITH MULTI SCATTER GAME

RELATED APPLICATIONS

This application is a CONTINUATION of application Ser. No. 13/036,541 filed on Feb. 28, 2011, which is a CONTINUATION of application Ser. No. 12/141,678 (now abandoned) filed on Jun. 18, 2008, which is a CONTINUATION of application Ser. No. 09/935,104 (now abandoned) filed on Aug. 22, 2001, which claims priority to Australian Provisional Patent Application No. PQ 9587, having an international filing date of Aug. 22, 2000, entitled "Gaming Machine With Multi Scatter Game." Each application mentioned in this paragraph is hereby incorporated by reference herein in its entirety.

BACKGROUND OF THE INVENTION

This invention relates to a gaming machine. More particularly, the invention relates to a gaming machine and to an improvement to a game played on such a gaming machine. Players who regularly play gaming machines quickly tire of particular games and therefore it is necessary for manufacturers of these machines to develop innovative game features which add interest to the games. In so doing, it is hoped to keep players amused and therefore willing to continue playing the games as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

BRIEF SUMMARY OF THE INVENTION

According to the invention, there is provided a gaming machine having a display means and a game control means arranged to control images displayed on the display means, the game control means being arranged to play a game wherein at least one random event is caused to be displayed on the display means and, if a predefined winning event occurs, the machine awards a prize, the gaming machine being characterized in that the display means displays a plurality of spinning reels, each reel carrying symbols from a set of symbols, one of the symbols of the set being a scatter symbol and, in respect of at least one of the reels, the set comprising more than one occurrence of the scatter symbol, the scatter symbols on said at least one reel being arranged on the reel so that more than one scatter symbol is able to be displayed simultaneously when the reels are in a rest condition and, when more than a minimum number of scatter symbols are displayed at any one time, all the displayed scatter symbols contributing to a single paying combination of the scatter symbols.

The display means may be a video display unit and the display of the reels may be constituted by a video simulation of spinning reels.

It will be appreciated that, to achieve a winning combination, a predetermined number of the symbols must be displayed. Normally, at least three symbols constitute a winning combination. Hence, the minimum number of the scatter symbols which must be displayed to constitute a winning combination may be three scatter symbols.

The set of symbols on each of the reels may have more than one occurrence of the scatter symbol. Preferably, the set of symbols of each reel has at least two scatter symbols. The scatter symbols may be positioned on each reel such that up to three scatter symbols are able to be displayed together at any one time. Hence, for a five reel video simulation, a maximum of fifteen scatter symbols may be able to be displayed at once to constitute a fifteen of a kind winning combination.

BRIEF DESCRIPTION OF SEVERAL VIEWS OF THE DRAWINGS

The invention is now described by way of example with reference to the accompanying diagrammatic drawings in which:

FIG. 3 shows a table of reel strips for a game to be played on the gaming machine of FIG. 1;

DETAILED DESCRIPTION OF THE INVENTION

Figure 1:
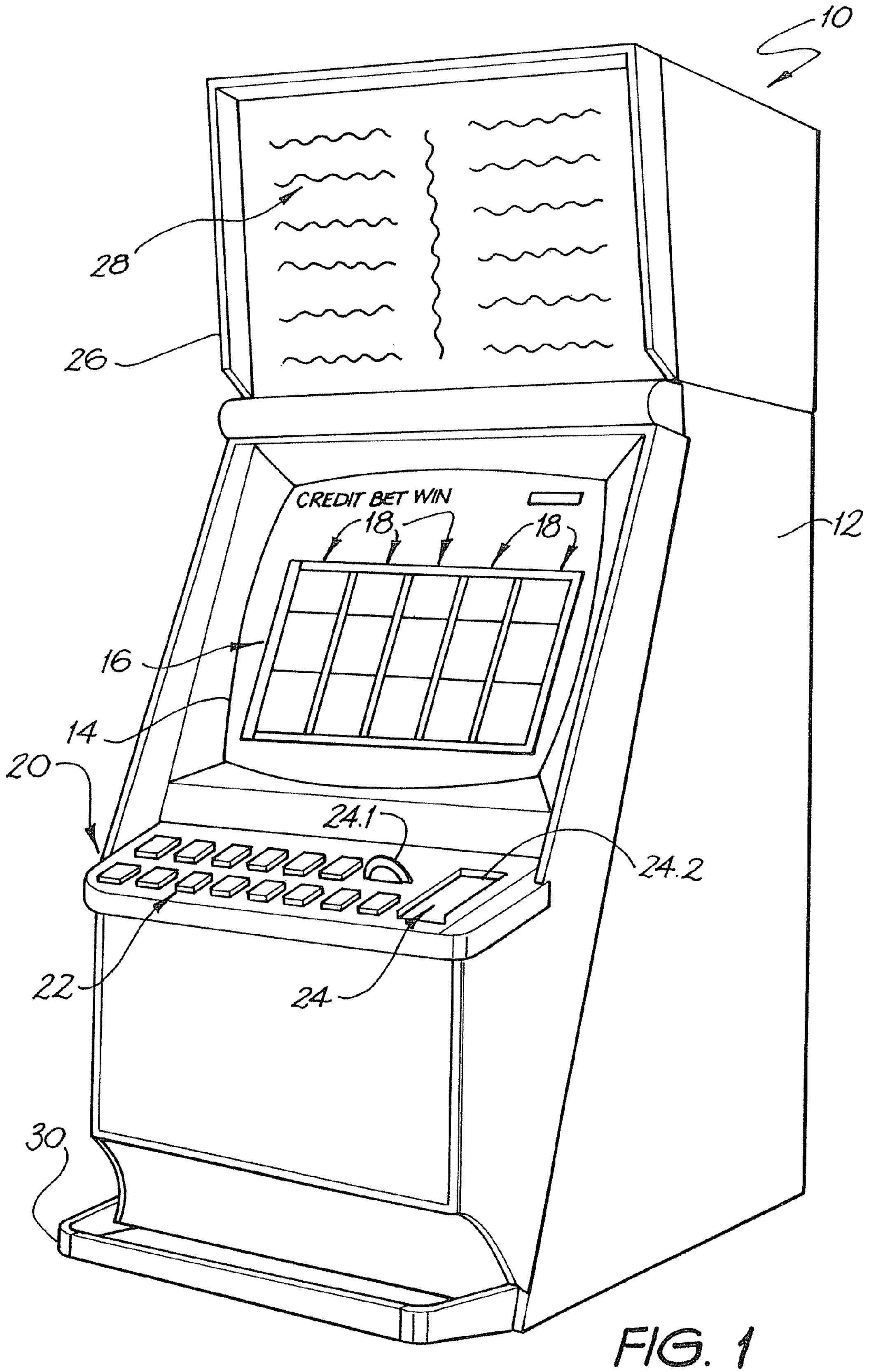
FIG. 1 shows a perspective view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18.

A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
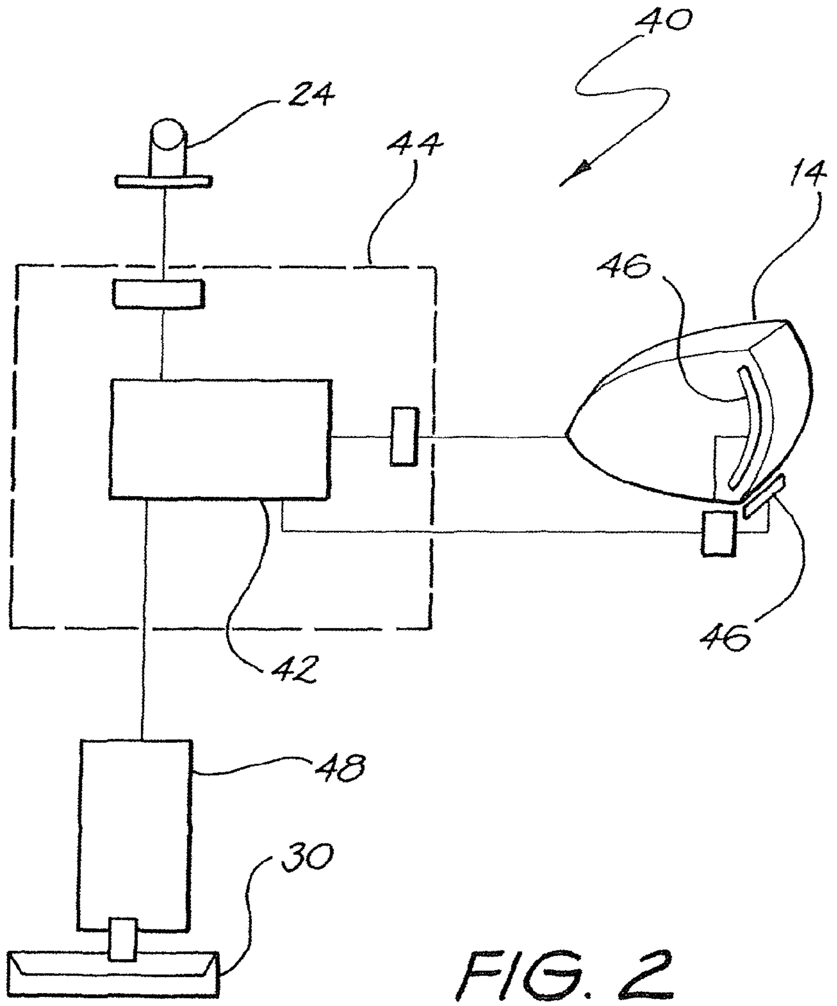
FIG. 2 shows a block diagram of a control circuit of the gaming machine.

Referring now to FIG. 2 of the drawings, a control means or control circuit 40 is illustrated, A program which implements the game and user interface is run on a processor 42 of the control circuit 40. The processor 42 forms part of a controller 44 which drives the screen of the video display unit 14 and which receives input signals from sensors 46. The sensors 46 include sensors associated with the bank 22 of buttons and touch sensors associated with the screen 16. The controller 44 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 44 drives a payout mechanism 48 which, for example, may be a coin hopper for feeding coins to the coin tray 30 to make a pay out to a player when the player wishes to redeem his or her credit.

As indicated above, the game 16 is a spinning reel game which simulates the rotation of a number of spinning reels 18. The controller 44 contains, in a memory (not shown), data relating to reel strips. Each position on the reel strip maps to a corresponding position on the reel 18 to be displayed, The controller 44 selects random locations of the reel strips which map to the positions at which the reels 18 will stop.

As illustrated in FIG. 3 of the drawings, each reel strip 50 contains two scatter symbols 52 thereon. The scatter symbols 52 are either arranged adjacent each other on the reel strips 50 or, as shown in respect of reel strips one and three, the scatter symbols are separated from each other by, at most, one other symbol which may be a standard symbol or another special symbol.

Consequently, it is possible for both scatter symbols 52 on each reel 18 to be visible simultaneously in a screen display 54 (FIG. 4) if the relevant reel 18 stops in the appropriate position.

Insofar as conventional, standard symbols of a set of symbols of the reels 18 are concerned, normally a minimum number of symbols, preferably three, is required in order for a winning combination to result. The symbols must appear in a predetermined order on an active payline of the game. For example, most gaming machines pay for left-to-right winning combinations appearing on any active payline.

However, with scatter symbols, the appearance of a predetermined number of the scatter symbols, anywhere on the screen 16, results in a winning combination. In other words, scatter symbols need not appear on active paylines to be eligible to contribute to a winning combination.

The set of symbols associated with reels of spinning reel type games normally each only have a single scatter symbol or the symbols are laid out on reel strips of the reels so that it is not possible to get more than one scatter symbol displayed in respect of that reel at the same time. Also, for cases where it may be possible to get more than one scatter symbol displayed on the same reel at any one time, each of the symbols on the same reel is regarded separately when determining winning combinations. For example, two scatter symbols on the same reel will not constitute two scatters towards a single winning combination but rather two separate occurrences that may each contribute to separately paying winning combinations in respect of the scatter symbols. Hence, the maximum number of scatter symbols that can make up a single paying scatter combination will be equal to the number of reels of the spinning reel game.

The reel strips 50 are set up in such a way so as to allow for two or more scatter symbols to be displayed simultaneously on the screen 16 in respect of each reel 18. When this occurs, each scatter symbol contributes to a single paying winning combination of scatter symbols.

In respect of the reel strips 50 illustrated in FIG. 3 of the drawings it will, accordingly, be possible to obtain a winning combination of ten scatter symbols. It will, however, also be appreciated that it is feasible, in respect of a five reel game with a window of three symbols displayed per reel, to have up to fifteen of a kind winning combinations.

Figure 4:
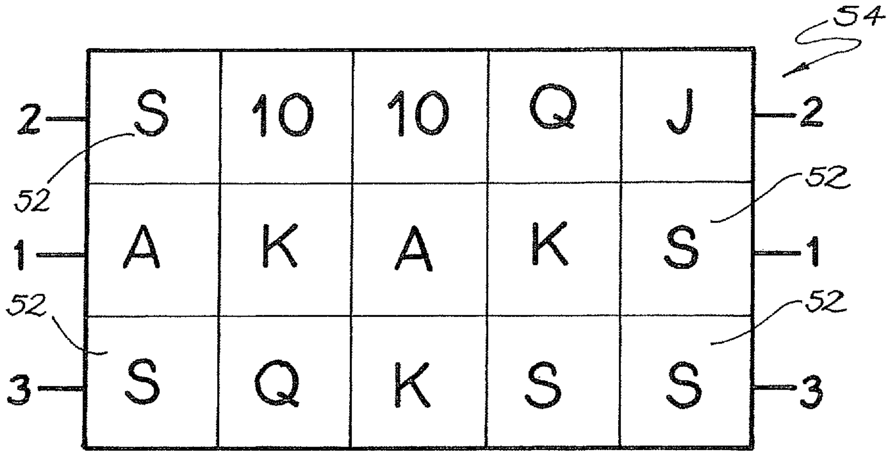
FIG. 4 shows a first example of a screen display the game.

In the example of the game shown in FIG. 4 of the drawings, it is assumed that the reels 18 stop at positions 5, 4, 16, 9 and 5 of the reel strips 50 to generate the screen display shown in FIG. 4 of the drawings. This embodiment will pay a prize for five scatter symbols.

Figure 5:
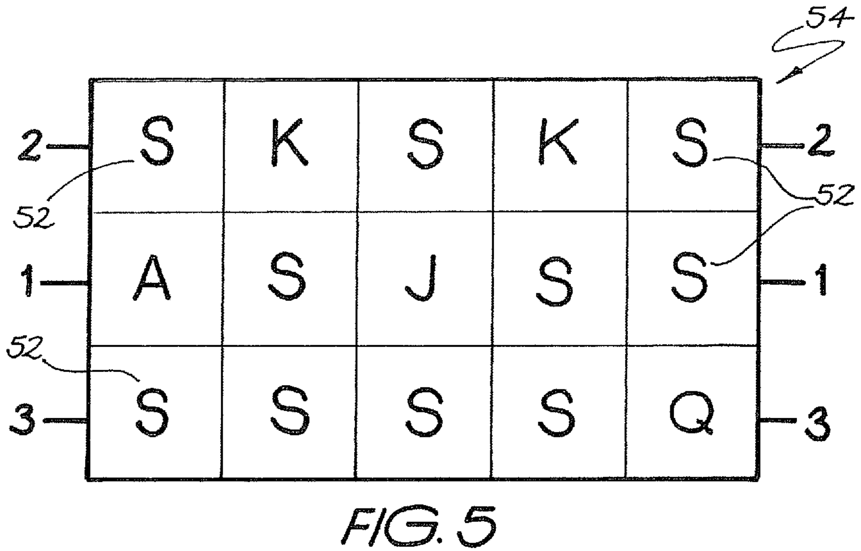
FIG. 5 shows a second example of a screen display of the game.

Assuming that the reels 18 stop at positions 5, 10, 6, 10, 6 of the reel strips 50, as shown in FIG. 5, the maximum scatter prize of ten of a kind scatter symbols will be awarded.

Hence, it is an advantage of the invention that a game is provided which can pay a prize for more scatter symbols than there are reels.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method performed by a gaming machine having a display with a plurality of display positions, comprising:

spinning a plurality of reels of the gaming machine, wherein each reel includes a plurality of standard symbols and a plurality of scatter symbols and is configured to display a plurality of symbols in respective ones of the plurality of display positions when at rest, wherein the plurality of scatter symbols is at least equal in number to the plurality of display positions, and wherein each reel includes scatter symbols positioned adjacent to each other;

permitting the reels to come to rest after said spinning; and awarding a prize in response to the plurality of reels displaying only scatter symbols in each of the plurality of display positions after said plurality of reels come to rest.

2. The method of claim 1, wherein said spinning comprises generating a video simulation of spinning reels upon a display.

3. The method of claim 1, further comprising awarding a second prize in response to the plurality of reels displaying a winning combination of standard symbols that are aligned with a payline after said plurality of reels come to rest.

4. The method of claim 1, further comprising awarding a second prize in response to the plurality of reels displaying a winning combination of standard symbols that are aligned with a payline of a plurality of paylines after said plurality of reels come to rest.

5. The method of claim 1, further comprising awarding a second prize in response to the plurality of reels displaying a predetermined number of scatter symbols that is less than all symbols displayed after the plurality of reels come to rest.

6. The method of claim 1, further comprising accepting a wager, wherein said awarding comprises providing a payout based upon the wager.

7. The method of claim 1, further comprising displaying with each reel at least three symbols after the plurality of reels come to rest.

8. A non-transitory computer readable storage medium, comprising a plurality of instructions that, in response to being executed, result in a gaming machine:

spinning a plurality of reels, wherein each reel includes a plurality of standard symbols and a plurality of scatter symbols and is configured to display a plurality of symbols in respective ones of a plurality of display positions of the gaming machine when at rest, wherein the plurality of scatter symbols is at least equal in number to the plurality of display positions, and wherein each reel includes scatter symbols positioned adjacent to each other;

permitting the reels to come to rest after said spinning; and awarding a prize in response to the plurality of reels displaying only scatter symbols in each of the plurality of display positions after said plurality of reels come to rest.

9. The non-transitory computer readable storage medium of claim 8, wherein execution of the plurality of instructions further results in the gaming machine spinning the plurality of reels by generating a video simulation of spinning reels upon a display.

10. The non-transitory computer readable storage medium of claim 8, wherein execution of the plurality of instructions further results in the gaming machine awarding a second prize in response to the plurality of reels displaying a winning combination of standard symbols that are aligned with a payline after said plurality of reels come to rest.

11. The non-transitory computer readable storage medium of claim 8, wherein execution of the plurality of instructions further results in the gaming machine awarding a second prize in response to the plurality of reels displaying a winning combination of standard symbols that are aligned with a payline of a plurality of paylines after said plurality of reels come to rest.

12. The non-transitory computer readable storage medium of claim 8, wherein execution of the plurality of instructions further results in the gaming machine awarding a second prize in response to the plurality of reels displaying a predetermined number of scatter symbols that is less than all symbols displayed after the plurality of reels come to rest.

13. The non-transitory computer readable storage medium of claim 8, wherein execution of the plurality of instructions further results in the gaming machine awarding the prize by providing a payout based upon an accepted wager.

14. The non-transitory computer readable storage medium of claim 8, wherein execution of the plurality of instructions further results in the gaming machine displaying with each reel at least three symbols after the plurality of reels come to rest.

15. A gaming machine, comprising:

a plurality of reels, wherein each reel includes a plurality of standard symbols and a plurality of scatter symbols and is configured to display a plurality of symbols in respective ones of a plurality of display positions when at rest, wherein the plurality of scatter symbols is at least equal in number to the plurality of display positions, and wherein each reel includes scatter symbols positioned adjacent to each other; and a game controller configured to initiate a spin of the plurality of reels, permit the reels to come to rest after the spin, and award a prize in response to the plurality of reels displaying only scatter symbols in each of the plurality of display positions after said plurality of reels come to rest.

16. The gaming machine of claim 15, further comprising a video display unit configured to depict a video simulation of spinning the plurality reels.

17. The gaming machine of claim 15, wherein the game controller is further configured to award a second prize in response to the plurality of reels displaying a winning combination of standard symbols that are aligned with a payline after said plurality of reels come to rest.

18. The gaming machine of claim 15, wherein the game controller is further configured to award a second prize in response to the plurality of reels displaying a winning combination of standard symbols that are aligned with a payline of a plurality of paylines after said plurality of reels come to rest.

19. The gaming machine of claim 15, wherein the game controller is further configured to award a second prize in response to the plurality of reels displaying a predetermined number of scatter symbols that is less than all symbols displayed after the plurality of reels come to rest.

20. The gaming machine of claim 15, further comprising a credit input device configured to receive credits for a wager, wherein the game controller is further configured to award the prize as a payout based upon the wager.

* * * * *